(12) United States Patent
Aida

(10) Patent No.: US 8,429,336 B2
(45) Date of Patent: Apr. 23, 2013

(54) DISK DRIVE AND METHOD OF CHANGING A PROGRAM THEREFOR

(75) Inventor: Toru Aida, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 755 days.

(21) Appl. No.: 12/620,497

(22) Filed: Nov. 17, 2009

(65) Prior Publication Data

US 2010/0125700 A1 May 20, 2010

(30) Foreign Application Priority Data

Nov. 17, 2008 (JP) ................................ 2008-293950

(51) Int. Cl.
*G06F 12/06* (2006.01)
*G06F 9/24* (2006.01)
*G06F 12/16* (2006.01)

(52) U.S. Cl.
USPC .... 711/103; 711/112; 711/162; 711/E12.083; 711/E12.103; 713/2

(58) Field of Classification Search .......................... None
See application file for complete search history.

(56) References Cited

U.S. PATENT DOCUMENTS

| 5,608,910 A * | 3/1997 | Shimakura .................... 718/100 |
| 2005/0160257 A1 | 7/2005 | Kruger et al. |
| 2008/0052506 A1 | 2/2008 | Iima et al. |

FOREIGN PATENT DOCUMENTS

| JP | 08069376 | 3/1996 |
| JP | 2006189973 | 7/2006 |
| JP | 2007148553 | 6/2007 |

* cited by examiner

*Primary Examiner* — Denise Tran

(57) ABSTRACT

A method of changing a program for controlling a disk drive that includes an EEPROM. The method includes storing a program block to a disk area such that the program block is associated with a second area for storing the program block that is not utilized for a read operation from the disk area. The method also includes storing a program block that is associated with a first area to an area that includes at least a portion of the second area in the EEPROM such that the first area contained a program block that is utilized for a read operation from the disk area. In addition, the method includes changing the program block in the first area after storing to the second area. Moreover, the method includes storing to the second area the program block that is not utilized for a read operation from the disk area after storing to the first area.

8 Claims, 10 Drawing Sheets

| CHECK POINT | FIRMWARE COMPONENT | | |
| --- | --- | --- | --- |
| | SECOND EEPROM | FIRST EEPROM | RAM CODE |
| 0 | PREVIOUS | PREVIOUS | PREVIOUS |
| 1 | PREVIOUS | PREVIOUS | UPDATING |
| 2 | UPDATING | PREVIOUS | NEW |
| 3-6 | NEW | UPDATING | NEW |
| 0 | NEW | NEW | NEW |

FIG. 8

| CHECK POINT | FIRST EEPROM | | | | |
| --- | --- | --- | --- | --- | --- |
| | ROM0 4K | ROM1 60K | ROM2 32K | ROM4 28K | ROM3 4K |
| 3 | PREVIOUS | PREVIOUS | PREVIOUS | SPACE | UPDATING |
| 4 | PREVIOUS | PREVIOUS | UPDATING | | NEW (ROM0) |
| 5 | PREVIOUS | UPDATING | NEW (ROM1) | | NEW (ROM0) |
| 6 | PREVIOUS | NEW | UPDATING | SPACE | NEW (ROM0) |
| 0 | PREVIOUS | NEW | NEW | SPACE | NEW (ROM0) |

DISK DRIVE AND METHOD OF CHANGING A PROGRAM THEREFOR

CROSS-REFERENCE TO RELATED APPLICATION

This application claims priority from the Japanese Patent Application No. 2008-293950, filed Nov. 17, 2008, the disclosure of which is incorporated herein in its entirety by reference.

TECHNICAL FIELD

Embodiments of the present invention relate to a disk drive and a method of changing a program therefor, and in particular, relates to update of a program stored in an EEPROM implemented in a disk drive.

BACKGROUND

Data-storage disks in accordance with various recording schemes, such as optical disks, magneto-optical disks, and magnetic-recording disks, are known in the art. In particular, hard-disk drives (HDDs) employing rotatable magnetic-recording disks as storage media have been used in various fields as disk drives that possess both high speed performance and high data-storage capacity. With the increase in data-storage capacity and performance of HDDs, HDDs are increasingly updating their firmware in order to add new functions, or to change the configuration parameters in the HDDs after their delivery. Therefore, engineers and scientists engaged in HDD manufacturing and development are interested in methods that are capable of updating a program stored in a HDD to meet the rising demands of the marketplace for increased data-storage capacity and performance.

SUMMARY

Embodiments of the present invention include a method of changing a program for controlling a disk drive that includes an EEPROM. The method includes storing a program block to a disk area such that the program block is associated with a second area for storing the program block that is not utilized for a read operation from the disk area. The method also includes storing a program block that is associated with a first area to an area that includes at least a portion of the second area in the EEPROM such that the first area contained a program block that is utilized for a read operation from the disk area. In addition, the method includes changing the program block in the first area after storing to the second area. Moreover, the method includes storing to the second area the program block that is not utilized for a read operation from the disk area after storing to the first area.

DESCRIPTION OF THE DRAWINGS

The accompanying drawings, which are incorporated in and form a part of this specification, illustrate embodiments of the invention and, together with the description, serve to explain the embodiments of the present invention:

FIG. 8 is a drawing showing checkpoints corresponding to operations of update process in the magnetic-recording disk, the first EEPROM, and the second EEPROM, in accordance with an embodiment of the present invention.

FIG. 9 is a drawing showing checkpoints corresponding to states of an update process in the first EEPROM, in accordance with an embodiment of the present invention.

Figure 1:
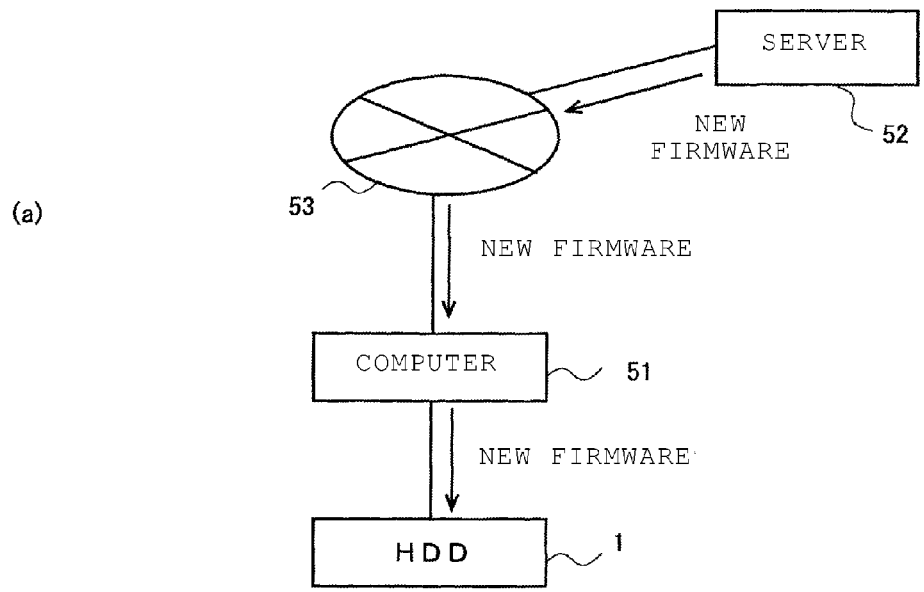
FIGS. 1(a) and 1(b) are block diagrams schematically illustrating an example of a system for updating firmware, in accordance with an embodiment of the present invention.
Figure 1:
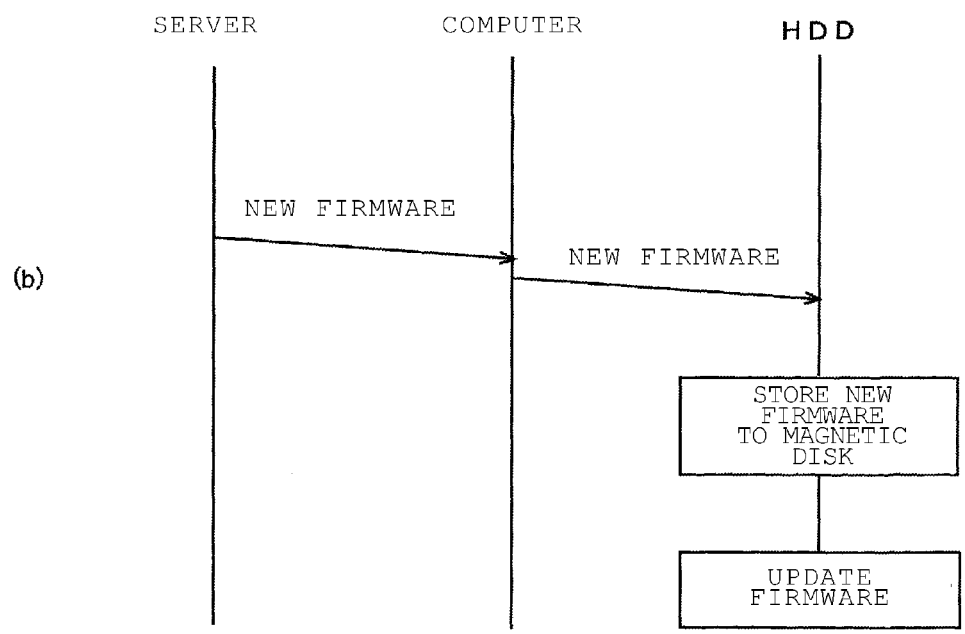

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

DESCRIPTION OF EMBODIMENTS OF THE PRESENT INVENTION FOR A DISK DRIVE AND A METHOD OF CHANGING A PROGRAM THEREFOR

With relevance to embodiments of the present invention, in consideration of time, cost, and efficiency, service centers or factories avoid collecting HDDs, which have been delivered to end users as components of finished products, to update their firmware. Hence, if the firmware is to be updated, new firmware is distributed. The host computer connected to a HDD downloads new firmware into the HDD to update the firmware. Typically, there is a protocol for updating firmware between a HDD and a host computer; the HDD transmits and receives data for updating the firmware to and from the host in accordance with a downloading protocol.

An update of the firmware is performed safely and reliably at end users. Even if update of the firmware is interrupted by an accidental power shut-down, the functions of the HDD are not to be lost. The update method which allows operation to be resumed in a state either before or after the update whenever the update of the firmware is interrupted is referred to by the term of art, "transaction update." This is a relatively common technique in applications which allow redundancy in the resources of hardware and software.

However, similar to HDDs, products having strict restrictions both in hardware and software have limited resources for redundancy that permits a conventional transaction update. An approach may be proposed that limits the update of the firmware to a portion of the firmware; but, as the proportion which has not been updated becomes larger, the value of the update of the firmware will be lost. Accordingly, embodiments of the present invention can perform a transaction update even under the condition that the hardware resources and software resources are limited, for example, as in a HDD.

Embodiments of the present invention include a method of changing a program for controlling a disk drive that includes an EEPROM in the disk drive. The method stores a program block to a disk area such that the program block is associated with a second area for storing a program block that is not utilized for a read operation from the disk area. The method also stores a program block associated with a first area to an area including at least a portion of the second area in the EEPROM, such that the first area has contained a program block that is utilized for a read operation from the disk area. In addition, the method changes the program block in the first area after the storing to the second area. Moreover, the method stores to the second area the program block that is not utilized for a read operation from the disk area after the storing to the first area. Thus, in accordance with embodiments of the present invention, in a disk drive having an EEPROM with a limited capacity, a program contained in the EEPROM can be changed safely.

In accordance with embodiments of the present invention, a new program including a new first program block to be stored to the first area and a new second program block to be stored to the second area are obtained and stored to the disk area; the program block associated with the second area is the new second program block; the program block associated with the first area is the new first program block; and, the program block to be stored to the second area after the change of the first area is the new second program block. Thus, in accordance with embodiments of the present invention, a safe update of a program can be provided through a simple process.

Moreover, in one embodiment of the present invention, the method stores a new boot code included in the new program to free space in the EEPROM and preserves both a boot code that has already been stored in the EEPROM and the new boot code. Thus, in an embodiment of the present invention, boot code can be changed without causing difficulties in a subsequent start-up.

In another embodiment of the present invention, a program block for a portion of the program for controlling the disk drive is contained in the disk area; and, the program block for the portion of the program in the disk area is changed by the new program stored in the disk area after the program block for the portion of the program in the disk area has been backed up to another area in the disk area. Thus, in an embodiment of the present invention, in a disk drive having an EEPROM with a smaller capacity relative to a large program, the program can be changed safely.

In another embodiment of the present invention, a new third program block in the new program contained in the disk area is stored to an area in a second EEPROM that is different from the EEPROM, after a third program block, which is contained in an area in the second EEPROM and is utilized for a read operation from the disk area, has been backed up to the EEPROM. Thus, in an embodiment of the present invention, while storing program blocks to appropriate memory areas in accordance with the characteristics of the program block, a safe program change can be provided.

In another embodiment of the present invention, the method stores data for identifying a current state of change in changing the program to an exclusive area selected from the group consisting of an area in the EEPROM, an area in another EEPROM and both an area in the EEPROM and an area in another EEPROM. Thus, in an embodiment of the present invention, if an accidental power shut-down happens in the course of change of a program, easy and reliable recovery is made possible.

Embodiments of the present invention also include a disk drive that includes a program for controlling the disk drive. The disk drive includes a disk area for storing data, an EEPROM, and a controller. The EEPROM is configured to store a program block that is utilized for a read operation from the disk area to a first area and is further configured to store to a second area a program block that is not utilized for a read operation from the disk area. The controller is configured to store a program block associated with the first area to an area including at least a portion of the second area in the EEPROM, after storing to the disk area a program block associated with the second area, and then is configured to store to the second area the program block that is not utilized for a read operation from the disk area after changing the program block in the first area. Thus, in accordance with embodiments of the present invention, in a disk drive having an EEPROM with a limited capacity, a program contained in the EEPROM can be changed safely.

In accordance with embodiments of the present invention, a program contained in the EEPROM can be changed safely, in a disk drive having an EEPROM with a limited capacity. Embodiments of the present invention are next described, by way of example without limitation thereto, in the environment of a hard-disk drive (HDD), which is an example of a disk drive.

Another embodiment of the present embodiment includes a change of firmware, which is a program for controlling operations of a HDD. A HDD includes a plurality of rewritable non-volatile memory devices for storing firmware. One is a magnetic-recording disk and another is an EEPROM. In an embodiment of the present invention, an HDD includes two EEPROMs: the first EEPROM may be a flash memory in which the unit of erasure differs from the unit of data writing and data reading in size, and the second EEPROM may be an EEPROM in which the unit of erasure and the unit of data writing and/or data reading are the same in size. The change of firmware according to embodiments of the present invention provides a safe update of the firmware even though the memory capacity of the EEPROM is small, by way of proper selection of the memory area and timing for backing up program blocks of the firmware before a change, or alternatively, by way of proper selection of the storage area and timing for storing the program blocks which are included in the new firmware.

With reference now to FIGS. 1(a) and 1(b), in accordance with an embodiment of the present invention, block diagrams are shown that schematically illustrate an example of a system for updating the firmware. As illustrated in the block diagram of FIG. 1(a), the new firmware is transferred from a server 52 in the distributor to a computer 51 with an HDD 1 through a network 53. As illustrated in the block diagram of FIG. 1(b), the server 52 transmits the new firmware to the computer 51. The computer 51 transfers the received new firmware to the HDD 1. The HDD 1 stores the received new firmware to a magnetic-recording disk, and then rewrites the previous firmware into the new firmware. Prior to providing a detailed description of the update of firmware in the HDD 1, the configuration of the HDD 1 is next described.

Figure 2:
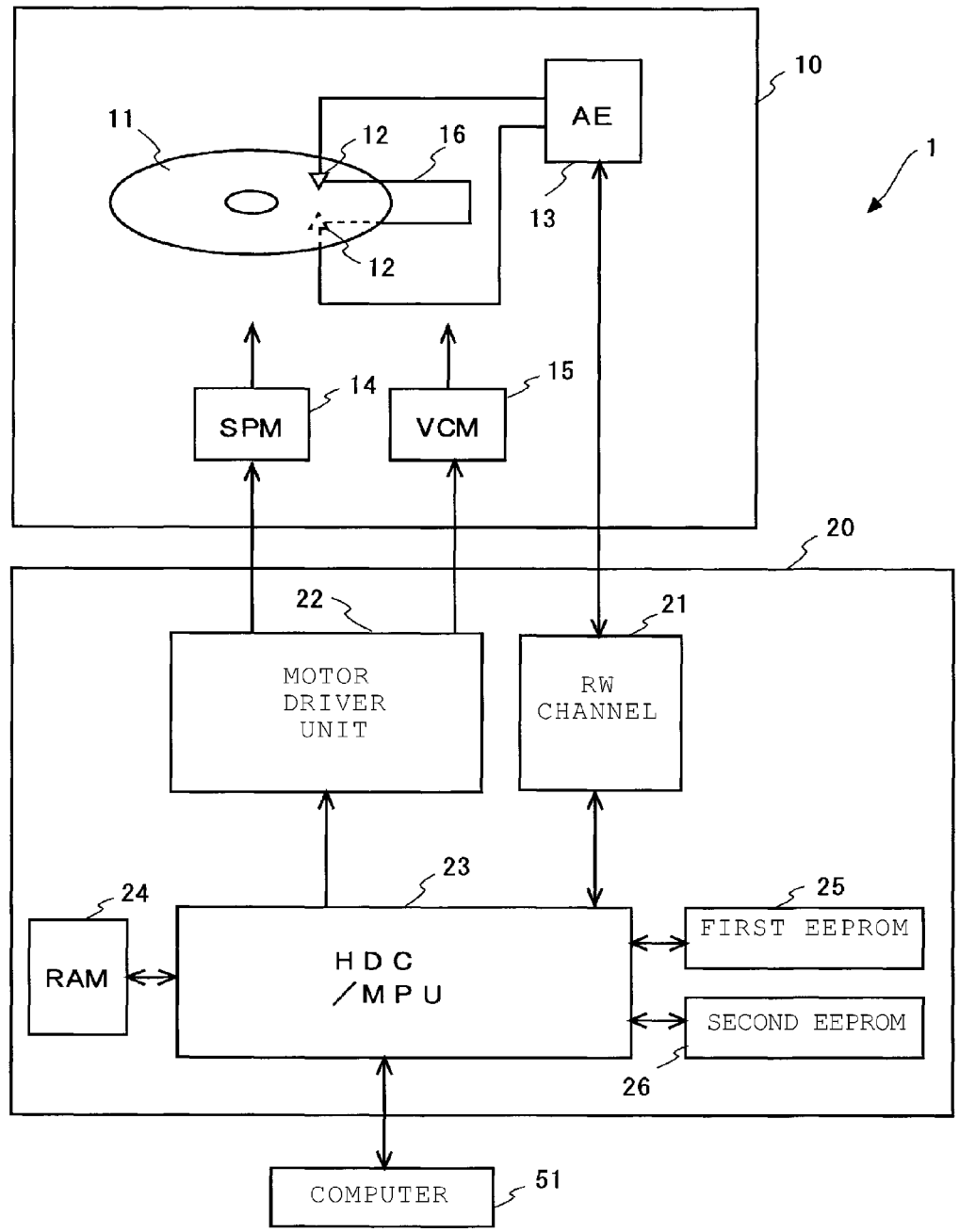
FIG. 2 is a block diagram schematically depicting the configuration of an HDD, in accordance with an embodiment of the present invention.

With reference now to FIG. 2, in accordance with an embodiment of the present invention, the HDD 1 includes a circuit board 20 affixed outside a disk enclosure (DE) 10. On the circuit board 20, various circuits, such as a read write channel (RW channel) 21, a motor driver unit 22, an integrated circuit (IC) hard-disk controller/microprocessor unit (HDC/MPU) 23 of a hard-disk controller (HDC) which is a logic circuit and a microprocessor unit (MPU), a random access memory (RAM) 24, a first electrically erasable and programmable read-only memory (EEPROM), and a second EEPROM, are implemented. Inside the DE 10, a spindle motor (SPM) 14 rotates a magnetic-recording disk 11 at a preset angular rate.

A head-slider 12 includes a slider for flying in proximity to the recording surface of the magnetic-recording disk 11 and a magnetic-recording head which is affixed on the slider and converts a magnetic signal to and from an electrical signal, which is associated with reading data from, and writing data to, the magnetic-recording disk 11, respectively. The head-slider 12 is affixed to the distal end of an actuator 16. The actuator 16, which is coupled to a voice coil motor (VCM) 15, rotates about a pivot shaft to move the head-slider 12 in proximity with the recording surface of the rotating magnetic-recording disk 11 in the radial direction of the magnetic-recording disk 11. The motor driver unit 22 drives the SPM 14 and the VCM 15 in accordance with control data from HDC/MPU 23.

An arm-electronics (AE) module 13 selects a head-slider 12 to access the magnetic-recording disk 11 from multiple head-sliders 12 in accordance with control data from HDC/MPU 23 and amplifies a read-back signal, or alternatively, a write signal. RW channel 21, in a read operation, extracts data from a read-back signal supplied from AE module 13 to decode the data, and transfers the data to HDC/MPU 23. In a write operation, RW channel 21 code-modulates write data transferred from HDC/MPU 23, converts the code-modulated data into a write signal, and supplies the write signal to AE module 13.

In HDC/MPU 23, the MPU runs as a processor in accordance with firmware loaded from the first EEPROM 25, the second EEPROM 26, and the magnetic-recording disk 11. In one embodiment of the present invention, the second EEPROM 26 is an EEPROM whose unit of erasure is the same in size as the unit of writing and/or reading; and, the first EEPROM is a flash memory. The first EEPROM 25 has a larger capacity than the second EEPROM 26. In this way, such two different types of EEPROMs allow storing data that is frequently updated in a disk drive to the second EEPROM 26, in which the unit of rewrite is smaller so that more rewrites are available than in a flash memory, regardless of the smaller capacity of the second EEPROM 26.

Firmware is loaded to a SRAM in HDC/MPU 23, RAM 24, or both the SRAM in HDC/MPU 23 and RAM 24. HDC/MPU 23 performs control of the HDD 1 and processes concerning data processing, such as: read and write operation control; command execution order management; head positioning control using a servo signal, which provides servo control; interface control to and from a computer 51; defect management; and, error handling.

HDC/MPU 23 of the present embodiment updates the firmware. The interface within HDC/MPU 23 receives data for update of the firmware from the computer 51. The MPU works in accordance with a firmware update program to update the firmware for controlling the operation of the HDD 1.

In one embodiment of the present invention, the firmware is stored separately in the magnetic-recording disk 11, the second EEPROM 26, and the first EEPROM 25. Accordingly, HDC/MPU 23 updates the codes in the three non-volatile memories in accordance with the new firmware obtained from the computer 51. The HDD 1 includes one or more magnetic-recording disks 11. The firmware may be stored in one recording surface of a magnetic-recording disk 11, or separately in a plurality of recording surfaces, or alternatively, in a plurality of magnetic-recording disks 11. Hereinbelow, an example in which the firmware is stored in the management area on a recording surface of a magnetic-recording disk 11 is next described; but, the firmware may be stored in any area of the disk area, which is the whole area of the magnetic-recording disks 11 mounted in the HDD 1.

Figure 3:
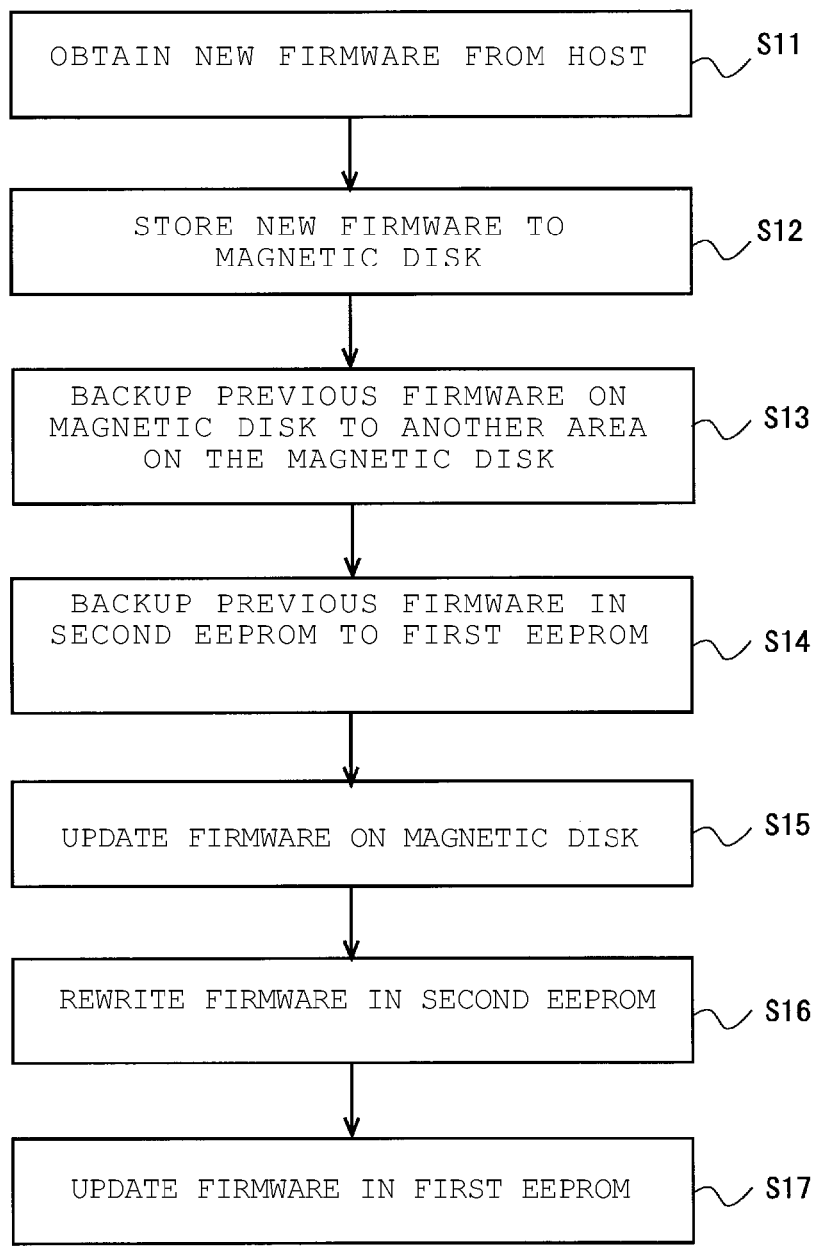
FIG. 3 is a flowchart illustrating a process of a firmware update, in accordance with an embodiment of the present invention.

With reference now to FIG. 3, in accordance with an embodiment of the present invention, a flowchart is shown that illustrates a process for firmware update. At S11, when HDC/MPU 23 obtains new firmware from the host computer 51, HDC/MPU 23 stores the new firmware to the management area on the magnetic-recording disk 11, at S12. Then, at S13, HDC/MPU 23 backs up the previous firmware stored in the management area on the magnetic-recording disk 11 to another area in the management area. Moreover, at S14, HDC/MPU 23 backs up the previous firmware stored in the second EEPROM 26 to the first EEPROM 25. Then, at S15, HDC/MPU 23 updates the firmware stored in the magnetic-recording disk 11. Furthermore, at S16, HDC/MPU 23 updates the second EEPROM 26. Finally, at S17, HDC/MPU 23 updates the first EEPROM 25.

Figure 4:
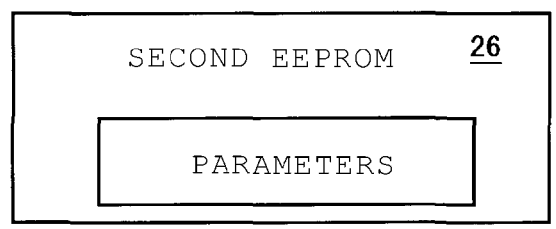
FIG. 4 is a drawing schematically illustrating an update process of the firmware in the second EEPROM, in accordance with an embodiment of the present invention.
Figure 4:
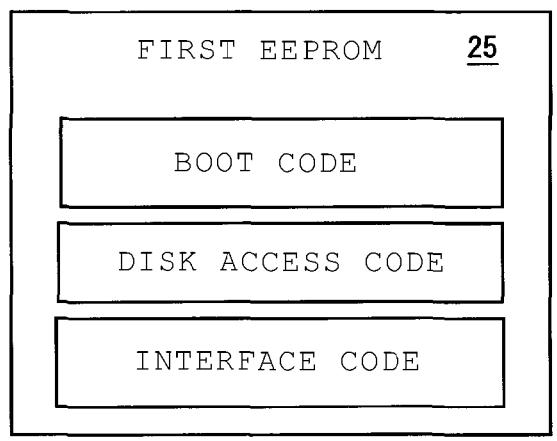
Figure 4:
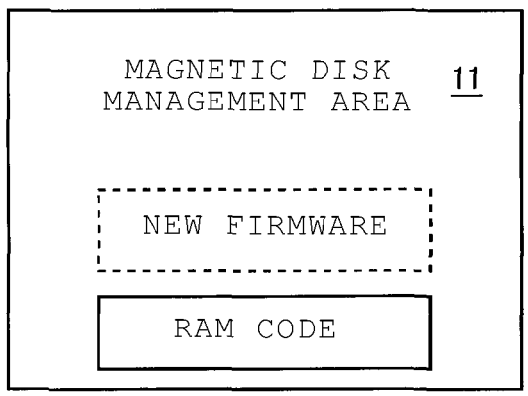

With reference now to FIG. 4, in accordance with an embodiment of the present invention, a block diagram is shown that schematically illustrates the firmware stored separately in three non-volatile memories. The names of the codes shown are for the major codes; and, other codes are also included. The second EEPROM 26 contains data which differ depending on the HDD, such as channel parameters. The first EEPROM 25 contains a boot code, a disk access code, and an interface code. The boot code is a code for initialization by the MPU; the MPU first accesses the address where the boot code is contained upon a start-up.

The disk access code is a code for HDC/MPU 23 to execute a process of reading data contained in the magnetic-recording disk 11 and is included in the codes that are utilized for servo control, or alternatively, for a read operation. In another embodiment of the present invention, the disk access code includes a firmware update program and a recovery process program upon the interruption of the update. For HDC/MPU 23 to read data from the magnetic-recording disk 11, the disk access code and the parameters in the second EEPROM 26 are utilized. The interface code includes the codes for performing an interface operation, which provides command processing, with the host computer 51, and further, other codes that are not utilized to access the magnetic-recording disk 11.

The magnetic-recording disk 11 contains the codes of the firmware other than the codes contained in the second EEPROM 26 and the first EEPROM 25 in the management area thereof. The management area is an area for storing management data other than user data. As described herein, management data other than user data is referred to by the term of art, "RAM code." As described with reference to FIG. 3, the new firmware transferred from the host computer 51 is saved in the management area of the magnetic-recording disk 11.

HDC/MPU 23 rewrites the firmware contained separately in the three non-volatile memories in accordance with the new firmware on the magnetic-recording disk 11. In this regard, HDC/MPU 23 updates the codes in each memory in accordance with the predetermined procedure so as to be able to recover if any accidental power shut-down happens during the rewrite that is associated with the update. As described herein, regardless of commands or parameters, the data to be used in operation of the MPU are referred to by the term of art, "programs." The disk access code, the interface code, the boot code, and the parameters are all program blocks. A program block associated with the area includes: a program block to be stored in an area of a non-volatile memory, a previous program block prior to the update, or a new program block after the update.

First, update of the firmware on the magnetic-recording disk 11 is next described. In the update of the firmware on the magnetic-recording disk 11, at S15, HDC/MPU 23 loads a new RAM code from the magnetic-recording disk 11 to RAM 24, or alternatively, SRAM, and further, writes the new RAM code to the area on the magnetic-recording disk 11 containing the previous RAM code. Thus, in an embodiment of the present invention, the RAM code on the magnetic-recording disk 11 is updated. The update of the firmware in the second EEPROM 26 is next described.

Figure 5:
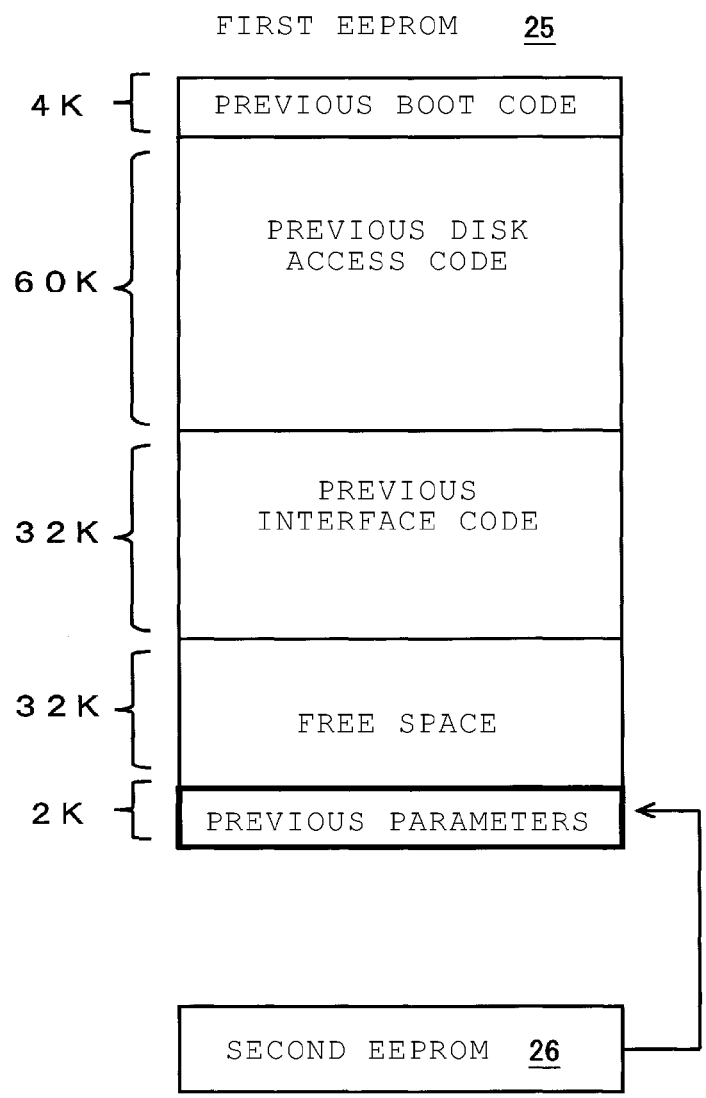
FIG. 5 is a drawing schematically further illustrating an update process of the firmware in the second EEPROM, in accordance with an embodiment of the present invention.

With reference now to FIG. 5, in accordance with an embodiment of the present invention, a drawing is shown that schematically illustrates an update process of the firmware in the second EEPROM. As illustrated in FIG. 5 and with further reference to FIG. 3, at S14, HDC/MPU 23 backs up the previous parameters in the second EEPROM 26 to the first EEPROM 25; and, then, at S16, HDC/MPU 23 starts updating the firmware in the second EEPROM 26. HDC/MPU 23 loads the previous parameters in the second EEPROM 26 onto RAM 24, or alternatively, SRAM, and stores the previous parameters to free space of the first EEPROM 25. In the example of FIG. 5, the capacity for storing the previous parameters is assumed to be 2 K. The values for data storage capacity in the following description are by way of examples without limitation thereto.

Furthermore, HDC/MPU 23 loads the new parameters from the magnetic-recording disk 11 to RAM 24, or alternatively, SRAM, and stores, in other words, rewrites, the new parameters to the area in the second EEPROM 26 containing the previous parameters. Thus, in an embodiment of the present invention, the update of the second EEPROM 26 is completed. The back-up of the previous parameters to the first EEPROM 25 allows recovering from an accidental power shut-down during the update of the second EEPROM 26, using the backed-up previous parameters.

The update of the firmware in the first EEPROM 25, at S17, is next described in detail. The firmware contained in the first EEPROM 25 before starting the update of the firmware in the first EEPROM 25 is shown in FIG. 5, namely the previous boot code, the previous access code, the previous interface code, and the previous parameters. Since the update of the second EEPROM 26 has been completed, the area for storing the previous parameters can be considered as free space.

Figure 6:
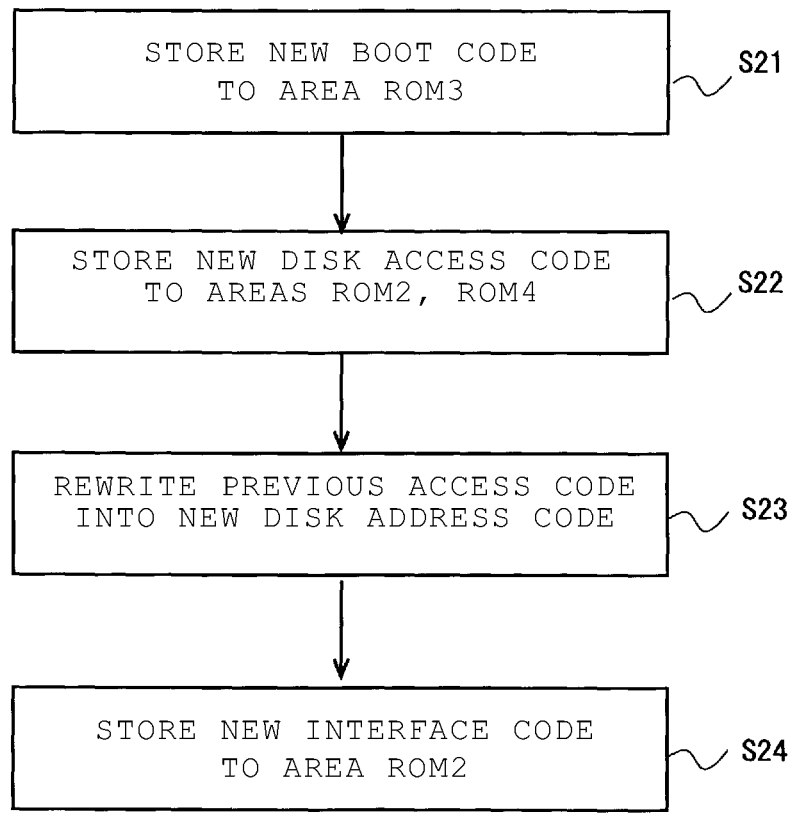
FIG. 6 is a flowchart illustrating an update process of the firmware in the first EEPROM, in accordance with an embodiment of the present invention.
Figure 7A:
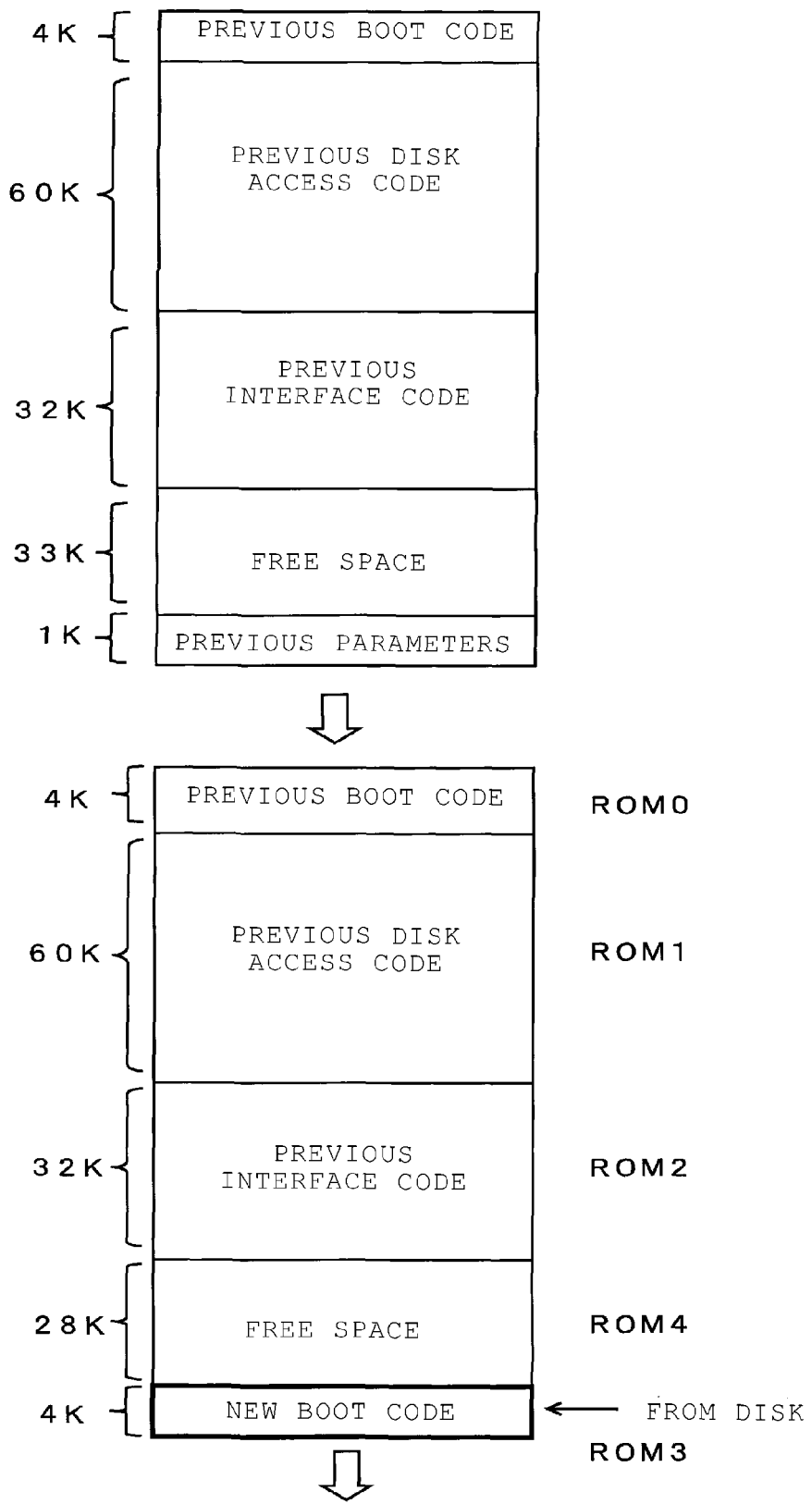
FIG. 7A is a drawing schematically illustrating the change of the stored data in the first EEPROM, which is associated with a state of the first EEPROM, in the update process of the firmware in the first EEPROM, in accordance with an embodiment of the present invention.

With reference now to FIG. 6, in accordance with embodiments of the present invention, a flowchart is shown that illustrates an update process of the firmware in the first EEPROM. As illustrated in the flowchart of FIG. 6, HDC/MPU 23 first stores the new boot code in the free space of the first EEPROM 25, at S21. With reference also to FIG. 7A, in accordance with an embodiment of the present invention, a drawing is shown that schematically illustrates the change of the stored data in the first EEPROM, at S21 of FIG. 6, which is associated with a state of the first EEPROM, in the update process of the firmware in the first EEPROM. In FIG. 7A, the new boot code is contained in an area ROM3, which includes the area having contained the previous parameters. HDC/MPU 23 reads the new boot code from the magnetic-recording disk 11 and stores the new boot code to the area ROM3 in the first EEPROM 25.

Figure 7B:
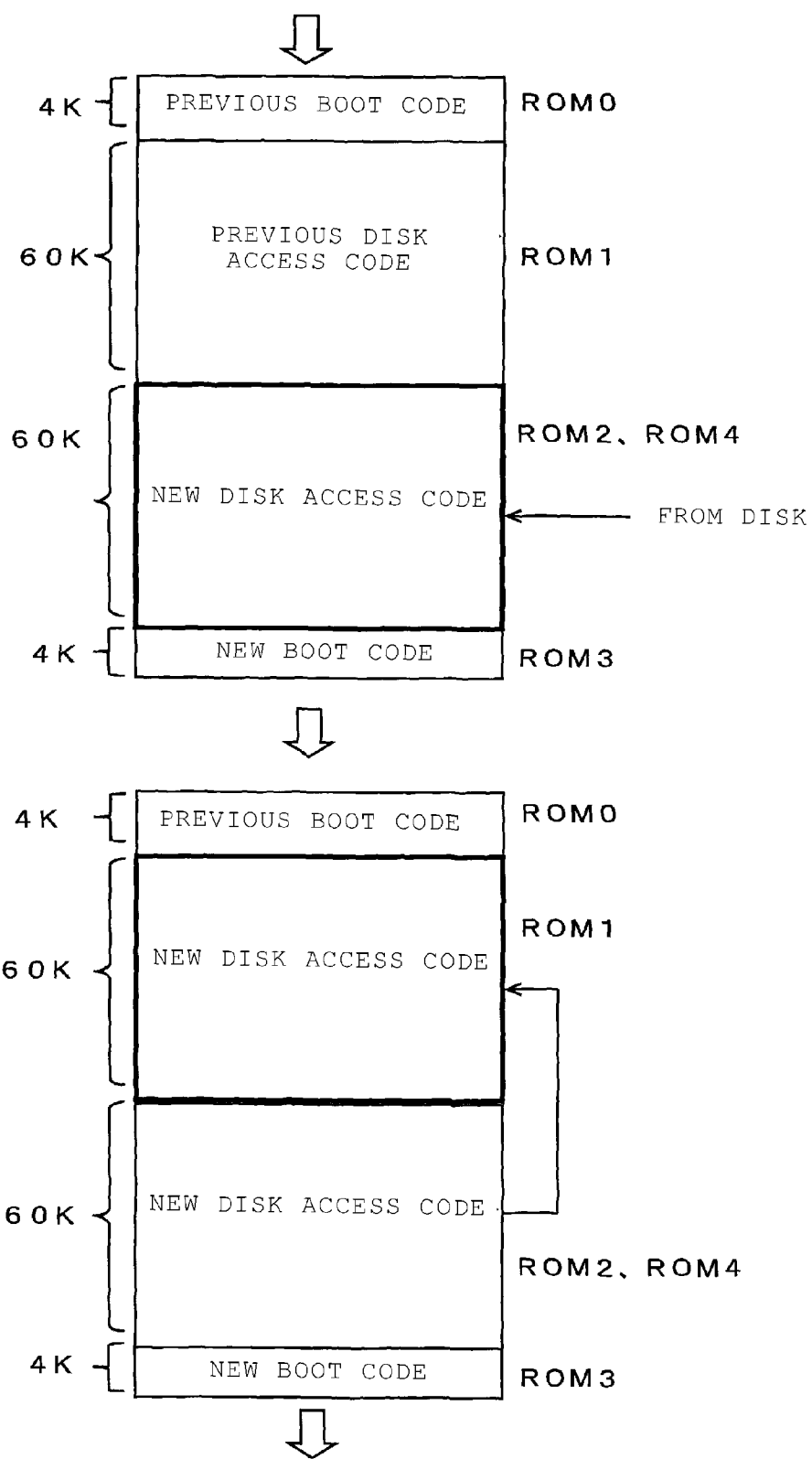
FIG. 7B is a drawing schematically further illustrating the change of the stored data in the first EEPROM, which is associated with a state of the first EEPROM, in the update process of the firmware in the first EEPROM, in accordance with an embodiment of the present invention.

As illustrated in FIG. 6, HDC/MPU 23 next stores the new access code to areas ROM2 and ROM4 in the first EEPROM 25, at S22. With reference now to the upper portion of FIG. 7B, in accordance with an embodiment of the present invention, a drawing is shown that schematically illustrates the change of the stored data in the first EEPROM, at S22 of FIG. 6, which is associated with a state of the first EEPROM, in the update process of the firmware in the first EEPROM. As illustrated in FIG. 7A, the area ROM2 is an area containing the previous interface code; and, the area ROM4 is free space. The total capacity of these areas is 60 KB, which is the same as the capacity of an area ROM1 containing the previous access code. As illustrated in the upper portion of FIG. 7B, HDC/MPU 23 reads the new disk access code from the magnetic-recording disk 11 and stores the new disk access code to the areas ROM2 and ROM4 in the first EEPROM 25. If the capacity of the new disk access code, which corresponds to the area ROM1, is smaller, only a portion of the area ROM2, or alternatively, a portion of the area ROM4, may be used for storing the new access code.

As is subsequently described, since the new interface code is contained in the magnetic-recording disk 11 and the previous interface code that is not utilized for a read operation from the magnetic-recording disk 11, an appropriate recovery operation is available even if the update is interrupted. Use of the area ROM2 for storing the new disk access code allows efficient use of the areas in the first EEPROM 25 and safe update of the firmware even if the capacity of the first EEPROM 25 is small.

Next, at S23, HDC/MPU 23 rewrites the previous disk access code into the new disk access code. With reference now to the lower portion of FIG. 7B, in accordance with an embodiment of the present invention, a drawing is shown that schematically illustrates the change of the stored data in the first EEPROM, at S23 of FIG. 6, which is associated with a state of the first EEPROM, in the update process of the firmware in the first EEPROM. HDC/MPU 23 retrieves the new disk access code from the areas ROM2 and ROM4 in the first EEPROM 25, loads the new disk access code into RAM 24, or alternatively, SRAM, and stores the new disk access code into the area ROM1 in the first EEPROM 25. Thus, in an embodiment of the present invention, the previous disk access code in the area ROM1 is rewritten into the new disk access code.

Figure 7C:
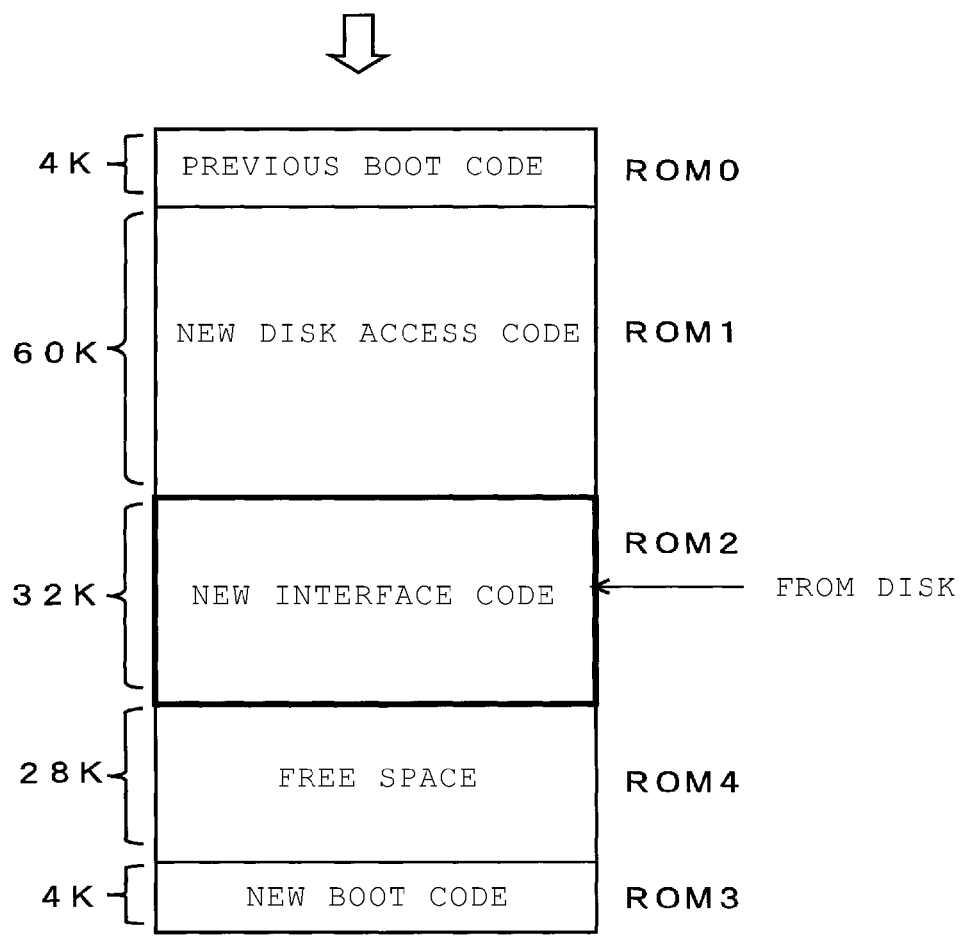
FIG. 7C is a drawing schematically yet further illustrating the change of stored data in the first EEPROM, which is associated with a state of the first EEPROM, in the update process of the firmware in the first EEPROM, in accordance with an embodiment of the present invention.

Finally, at S24, HDC/MPU 23 writes the new interface code into the area ROM2 in the first EEPROM 25. With reference now to FIG. 7C, in accordance with an embodiment of the present invention, a drawing is shown that schematically illustrates the change of stored data in the first EEPROM, at S24 of FIG. 6, which is associated with a state of the first EEPROM, in the update process of the firmware in the first EEPROM. HDC/MPU 23 reads the new interface code from the magnetic-recording disk 11, loads the new interface code to the RAM 24, or alternatively, SRAM, and stores the new interface code to the area ROM2 in the first EEPROM 25. The area ROM2 had contained the new disk access code, but is overwritten by the new interface code.

Through the above-described operations, the update of the firmware in the HDD 1 is completed. The previous boot code remains in an area ROM0 in the first EEPROM 25. The area ROM0 is an area that the MPU first accesses; and, the address of area ROM0 is fixed. Hence, if the update of the area ROM0 is interrupted, subsequent recovery is not available. Accordingly, the previous boot code is kept in the area ROM0, while the MPU runs in accordance with the new boot code in the area ROM3 in actual operations. Specifically, the MPU first loads the previous boot code and runs in accordance with the previous boot code; and, then, the MPU loads the new boot code. After the MPU has loaded the new boot code, the MPU runs in accordance with the new boot code.

The update of the firmware contained separately in the three non-volatile memories through the above-described process allows recovery whenever an accidental power shut-down happens. Consequently, the firmware update of the present embodiment can be implemented as a transactional update. The HDC/MPU 23 can make transition to the state prior to the update, or alternatively, to the state after the update, through the recovery process. Accordingly, the HDD 1 continues on working before or after the update. Hereinafter, the recovery process in the case that an accidental power shut-down happens at each operation of the above-described operations is next described.

HDC/MPU 23 administrates update states called checkpoints to control update-interruption recovery. HDC/MPU 23 stores the data indicating the checkpoints in an address area exclusively prepared in the second EEPROM 26 and administrates the data indicating the checkpoints independently from the update of the firmware. Since the checkpoints are small-size data, the use of the second EEPROM 26, whose minimum unit of rewrite is small, leads to effective use of the storage capacity. If the first EEPROM 25 can provide a similar area therein, data that indicates the checkpoints may be stored in the first EEPROM 25. When the firmware update is interrupted by an accidental power shut-down, HDC/MPU 23 executes a recovery process depending on the checkpoint at the subsequent power-on. This assures that HDD 1 successively works in the state before, or alternatively, after the firmware update.

With reference now to FIG. 8, in accordance with an embodiment of the present invention, a drawing is shown that shows checkpoints corresponding to the respective operations of the update in the magnetic-recording disk 11, the second EEPROM 26, and the first EEPROM 25. There exist checkpoints 0 to 6. The checkpoint 0 represents the state for which the firmware in the three non-volatile memories is all previous firmware before update, or alternatively, all new firmware after update.

The state in which the RAM code of the firmware on the magnetic-recording disk 11 are being updated (see S15 in FIG. 3) is checkpoint 1. The state in which the RAM code have been updated and the code in the second EEPROM 26 is being updated, at S16, is checkpoint 2. Checkpoints 3 to 6 are the states in which the code in the first EEPROM 25 is being updated, at S17. When HDC/MPU 23 starts an operation of the firmware update, HDC/MPU 23 updates the management information indicating the checkpoints.

With reference now to FIG. 9, in accordance with an embodiment of the present invention, a drawing is shown that shows the checkpoints 3 to 6 corresponding to the states in the update process in the first EEPROM 25. The checkpoint 3 is the state in which a new boot code is being written to the area ROM3 (see S21 in FIG. 6, also see FIG. 7A). The checkpoint 4 is the state in which a new disk access code is being written to the areas ROM2 and ROM4 after the new boot code has been written (see S22 in FIG. 6, also see FIG. 7B). The checkpoint 5 is the state in which the new disk access code in the areas ROM2 and ROM4 is being written to the area ROM1 (see S23 in FIG. 6, also see FIG. 7B). Finally, the checkpoint 6 is the state in which a new interface code is being written to the area ROM2 (see S24 in FIG. 6, also see FIG. 7C).

Hereinafter, a method of recovery by HDC/MPU 23 at the start-up subsequent to an accidental power shut-down at each of the above-described checkpoints is next described. If the management data within the second EEPROM 26 is the checkpoint 0, all of the firmware in the three non-volatile memories is in the state before or after the update, so recovery is not performed.

If the management data indicates the checkpoint 1, the update process is suspended in the course of update of the RAM code on the magnetic-recording disk 11. Hence, HDC/MPU 23 restores the previous RAM code in the original address area using the previous RAM code stored in another area of the management area of the magnetic-recording disk 11. Thus, in an embodiment of the present invention, the recovery process ends. The state after the recovery is the state prior to the firmware update.

If the management data indicates the checkpoint 2, the update process is suspended in the course of update of parameters in the second EEPROM 26. Then, the HDC/MPU 23 restores the previous parameters in the second EEPROM 26 using the backed up previous parameters in the first EEPROM 25 (refer to FIG. 5). Thus, in an embodiment of the present invention, HDC/MPU 23 can access the management area of the magnetic-recording disk 11 using the previous parameters in the second EEPROM 26 and the previous disk access code in the first EEPROM 25. HDC/MPU 23 executes the recovery process at the checkpoint 1 and returns the RAM code on the magnetic-recording disk 11 into the previous RAM code. Thus, in an embodiment of the present invention, the recovery process ends. The state after the recovery process is the state prior to the firmware update.

If the management data indicates checkpoint 3, the update process is suspended in the course of write of a new boot code to the first EEPROM 25, and/or in the course of update of the area ROM3. HDC/MPU 23 can access the management area of the magnetic-recording disk 11 using the previous boot code in the area ROM0 of the first EEPROM 25, new parameters in the second EEPROM 26, and the previous access code in the area ROM1 of the first EEPROM 25. Accordingly, HDC/MPU 23 reads the new boot code contained in the magnetic-recording disk 11 to continue the update process from the update of the area ROM3. The state after the recovery is the state after the firmware update.

If the management data indicates the checkpoint 4, the update process is suspended in the course of write of a new disk access code to the first EEPROM 25. HDC/MPU 23 can access the management area of the magnetic-recording disk 11 using the new boot code in the area ROM3 of the first EEPROM 25, new parameters in the second EEPROM 26, and the previous access code in the area ROM1 of the first EEPROM 25. Accordingly, HDC/MPU 23 reads the new boot code contained in the magnetic-recording disk 11 to continue the update process from the write of the new disk access code. The state after the recovery is the state after the firmware update.

If the management data indicates the checkpoint 5, the update process is suspended in the course of write of a new disk access code to the area ROM 1 of the first EEPROM 25, and/or in the course of update of the area ROM1. HDC/MPU 23 continues the update process from the write of the new disk access code in the areas ROM2 and ROM4 of the first EEPROM 25 to the area ROM1. The state after the recovery is the state after the firmware update.

If the management data indicates the checkpoint 6, the update process is suspended in the course of write of a new interface code to the first EEPROM 25. HDC/MPU 23 can access the management area of the magnetic-recording disk 11 using the new boot code in the area ROM3 of the first EEPROM 25, new parameters in the second EEPROM 26, and the new disk access code in the area ROM1 of the first EEPROM 25. Accordingly, HDC/MPU 23 reads the new interface code contained in the magnetic-recording disk 11 to resume the update process from the write of the new interface code to the area ROM2. The state after the recovery is the state after the firmware update.

According to the above-described update of firmware, the firmware in an HDD can be updated safely and efficiently. The above-described method obtains new firmware from a host and replaces the current firmware, which is the previous firmware before update, with the new firmware. In another embodiment of the present invention, to update the firmware in a simple manner, the new firmware is received from the host and the previous firmware is replaced with the new firmware. However, unlike the process in which the whole firmware is replaced with new firmware, embodiments of the present invention are applicable to a process in which the current firmware is partially changed.

A process to partially change the firmware replaces a portion of a plurality of program blocks which are included in the firmware. Another process to partially change the firmware rewrites a portion of one or each block of program blocks. Embodiments of the present invention can be applied to both of these processes.

As an example of the process to replace a portion of the program blocks, a process is next described that receives only a new disk access code from a host 51 to update the firmware therewith. The areas for storing program blocks in the two EEPROMs 25 and 26 are the same as those in the above-described configuration. Only the difference from the above-described configuration is next described.

First, HDC/MPU 23 receives a new disk access code from the host 51 and saves the new disk access code to the magnetic-recording disk 11. Furthermore, HDC/MPU 23 backs up the interface code in the area ROM2 to the magnetic-recording disk 11. Then, HDC/MPU 23 writes the previous disk access code in the area ROM1 to the areas ROM2 and ROM4.

Next, HDC/MPU 23 writes the new disk access code contained in the magnetic-recording disk 11 to the area ROM1. Finally, HDC/MPU 23 writes back the interface code backed up in the magnetic-recording disk 11 to the area ROM2. The other program blocks are not referred to in this process. This process flow allows recovery if an accidental power shut-down happens at any time.

In the case of replacing the interface code with a new interface code in addition to the disk access code, the new interface code instead of the previous interface code may be stored to the magnetic-recording disk 11. In this process, the new and the previous disk access codes are the program codes in association with the area ROM1; and, the new and the previous interface codes are the program codes in association with the area ROM2.

As an example of rewriting a portion of one or each of program blocks, a process is next described that changes only a portion of the disk access code. HDC/MPU 23 receives a program for changing a portion of the disk access code from a host 51 and stores the program for changing a portion of the disk access code to the magnetic-recording disk 11. HDC/MPU 23 stores, in other words, backs up, the interface code in the area ROM2 to the magnetic-recording disk 11, and then writes the disk access code to the area ROM1 to the areas ROM2 and ROM4.

HDC/MPU 23 changes the disk access code in RAM 24, or alternatively, in SRAM, in accordance with the program received from the host, and writes the disk access code to the area ROM1. Finally, HDC/MPU 23 writes the interface code on the magnetic-recording disk 11 to the area ROM2. If HDC/MPU 23 further changes the interface code, HDC/MPU 23 changes the interface code read from the magnetic-recording disk 11 in RAM 24, or alternatively, in SRAM, and then writes the interface code to the area ROM2. In this process, both of the disk access codes before and after the change are the program blocks associated with the area ROM1; and, both of the interface codes before and after the change are the program blocks associated with the area ROM2. This process flow allows recovery whenever an accidental power shut-down happens.

As set forth above, embodiments of the present invention have been described by way of examples; but, embodiments of the present invention are not limited to the above-described examples. A person skilled in the art can easily modify, add, and convert each element in the above-described examples within the spirit and scope of embodiments of the present invention. For example, embodiments of the present invention are also applicable to a HDD which includes only the first EEPROM as a non-volatile memory, which contains the parameters.

The proper order of the change of program blocks in the magnetic-recording disk, the first EEPROM, and the second EEPROM may be determined depending on the design. Embodiments of the present invention are applicable to firmware change other than firmware update. For example, embodiments of the present invention are applicable to firmware change where the firmware is returned to the original firmware after update. In one embodiment of the present invention, a new program received from the host is stored to the magnetic-recording disk because a recovery process can be performed within the HDD. Depending on the design, however, the program may be newly received from the host if an accidental power shut-down happens.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of changing a program for controlling a disk drive that includes an EEPROM in said disk drive, said method comprising:
storing a program block to a disk area, said program block being associated with a second area for storing a program block that is not utilized for a read operation from said disk area;
storing a program block associated with a first area to an area comprising at least a portion of said second area in said EEPROM, said first area having contained a program block that is utilized for a read operation from said disk area;
changing said program block in said first area after said storing to said second area;
storing to said second area said program block that is not utilized for a read operation from said disk area after said changing to said first area, wherein a new program comprising a new first program block to be stored to said first area and a new second program block to be stored to said second area are obtained and stored to said disk area; the program block associated with said second area is said new second program block; the program block associated with said first area is said new first program block; and the program block to be stored to said second area after said change of said first area is said new second program block; and
storing a new boot code to free space in said EEPROM, wherein said new program comprises said new boot code; and preserving both a boot code that has already been stored in said EEPROM and said new boot code.

2. The method of changing a program of claim 1, wherein a program block for a portion of said program for controlling said disk drive is contained in said disk area; and said program block for said portion of said program in said disk area is changed by said new program stored in said disk area after said program block for said portion of said program in said disk area has been backed up to another area in said disk area.

3. The method of changing a program of claim 1, wherein a new third program block in said new program contained in said disk area is stored to an area in a second EEPROM that is different from said EEPROM, after a third program block, which is contained in an area in said second EEPROM and is utilized for a read operation from said disk area, has been backed up to said EEPROM.

4. The method of changing a program of claim 1, further comprising:
storing data for identifying a current state of change in changing said program to an exclusive area selected from the group consisting of an area in said EEPROM and an area in another EEPROM.

5. A disk drive that includes a program for controlling said disk drive, said disk drive comprising:
a disk area for storing data;
an EEPROM for storing to a first area a program block that is utilized for a read operation from said disk area and for storing to a second area a program block that is not utilized for a read operation from said disk area; and
a controller for storing a program block associated with said first area to an area comprising at least a portion of said second area in said EEPROM, after storing to said disk area a program block associated with said second area, and then storing to said second area said program block that is not utilized for a read operation from said disk area after changing said program block in said first area, wherein the controller is configured to obtain a new program comprising a new first program block to be stored in said first area and a new second program block to be stored in said second area and is configured to store said new program to said disk area; the program block associated with said second area is said new second program block; the program block associated with said first area is said new first program block; and said program block to be stored to said second area after said change of said first area is said new second program block, and wherein the controller is configured to store a new boot code to free space in said EEPROM, wherein said new program comprises said new boot code; and is configured to preserve both a boot code that has already been stored in said EEPROM and said new boot code.

6. The disk drive of claim 5, wherein a program block of a portion of said program for controlling said disk drive is contained in said disk area; and the controller is configured to back up said program block of said portion of said program to another area in said disk area and then to change said program block of said portion of said program in said disk area in accordance with said new program stored in said disk area.

7. The disk drive of claim 5, further comprising:
a second EEPROM which is different from said EEPROM in a unit of operation and contains a third program block that is utilized for a read operation from said disk area; and wherein said controller is configured to back up said third program block to said EEPROM and then to store a new third program block in said new program contained in said disk area to an area in said second EEPROM.

8. The disk drive of claim 5, wherein the controller is configured to store data for identifying said current state of change in changing said program to an exclusive area selected from the group consisting of an area in said EEPROM and an area in another EEPROM.

* * * * *